(12) United States Patent
Nordstrand (10) Patent No.: US 6,334,052 B1
(45) Date of Patent: Dec. 25, 2001

(54) SUBSCRIPTION-BASED MOBILE STATION IDLE MODE CELL SELECTION

(75) Inventor: Ingrid Nordstrand, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/017,657

(22) Filed: Feb. 3, 1998

Related U.S. Application Data (60) Provisional application No. 60/039,997, filed on Mar. 7, 1997.

(51) Int. Cl.[7] ........................................... H04Q 7/20
(52) U.S. Cl. ........................... 455/411; 455/435; 455/434
(58) Field of Search ..................................... 455/422, 432, 455/433, 435, 552, 558, 403, 426, 456, 440, 434, 515, 411

(56) References Cited

U.S. PATENT DOCUMENTS

| | | |
|---|---|---|
| 5,175,867 | 12/1992 | Wejke et al. . |
| 5,251,249 | 10/1993 | Allen et al. . |
| 5,329,573 * | 7/1994 | Chang et al. ........................ 379/58 |
| 5,353,332 | 10/1994 | Raith et al. . |
| 5,404,580 | 4/1995 | Simpson et al. . |
| 5,444,764 | 8/1995 | Galecki . |
| 5,499,386 | 3/1996 | Karlsson . |
| 5,627,877 | 5/1997 | Penttonen . |
| 5,778,316 * | 7/1998 | Persson et al. ..................... 455/434 |
| 5,818,824 * | 10/1998 | Lu et al. ............................. 370/328 |

(List continued on next page.)

FOREIGN PATENT DOCUMENTS

| | | |
|---|---|---|
| 0505106A2 | 9/1992 | (EP) . |
| 0538014A2 | 4/1993 | (EP) . |
| 0641137A2 | 3/1995 | (EP) . |
| WO 95/07010 | 3/1995 | (WO) . |
| WO 96/07288 | 3/1996 | (WO) . |

OTHER PUBLICATIONS

Michel Mouly, et al., "The GSM System for Mobile Communications", Cell & Sys, Palaiseau, France, 1992, pp. 332–333, 426–429, 442–443, 452–459.

"Digital Cellular Telecommunications System (Phase 2); Radio Subsystem Link Control (GSM 05.08) ETSI", ETS 300 578, Jan. 1997, Eighth Edition, 49 pages.

"Digital Cellular Telecommunications System (Phase 2); Functions Related to Mobile Station (MS) in Idle Mode (GSM 03.22) ETSI", ETS 300 535, Sep. 1996, Fourth Edition, 44 pages.

Gérald Mazziotto, "The Subscriber Identity Module for the European Digital Cellular System GSM and Other Mobile Communication Systems", International Switching Symposium 1992, Proceedings vol. 1, Yokohama, Japan, Oct. 25–30, 1992, pp. 113–1116.

*Primary Examiner*—William Trost
*Assistant Examiner*—Congvan Tran
(74) *Attorney, Agent, or Firm*—Burns, Doane, Swecker & Mathis, L.L.P.

(57) ABSTRACT

Subscription-based information in a mobile telecommunications system is utilized to control idle mode operations of a mobile station. In one aspect, cell-related information is broadcast from cells. A mobile station then uses the received cell-related information to determine whether any given cell is part of a predefined service area that is reserved for use by only certain subscribers to the exclusion of other subscribers. The cell-related information may be a cell identifier that uniquely identifies a corresponding cell, or it may alternatively be a service area identifier that uniquely identifies a service area that comprises one or more cells. In either case, the mobile terminal makes its determination by accessing a memory such as a Subscriber Information Module (SIM), and retrieving therefrom stored information that defines the predefined service areas. In another aspect, the SIM may store information identifying preferred cells for the mobile station to camp on during idle mode.

17 Claims, 5 Drawing Sheets

U.S. PATENT DOCUMENTS

| | | | |
|---|---|---|---|
| 5,884,168 | * 3/1999 | Kolev et al. | 455/432 |
| 5,915,225 | * 6/1999 | Mills | 455/558 |
| 5,946,612 | * 8/1999 | Johansson | 455/405 |
| 5,950,130 | * 9/1999 | Coursey | 455/432 |
| 5,953,673 | * 9/1999 | Neubauer et al. | 455/518 |
| 5,983,107 | * 11/1999 | Hayashi et al. | 455/446 |
| 5,987,318 | * 11/1999 | Alperovich et al. | 455/416 |
| 5,995,834 | * 11/1999 | Moore | 455/434 |
| 5,999,811 | * 12/1999 | Molne | 455/432 |
| 6,081,697 | * 6/2000 | Haartsen | 455/109 |
| 6,081,731 | * 6/2000 | Boltz et al. | 455/565 |
| 6,122,525 | * 6/2000 | Krolopp et al. | 455/553 |
| 6,134,431 | * 10/2000 | Matsumoto et al. | 455/411 |
| 6,138,018 | * 10/2000 | Pashtan et al. | 455/435 |

* cited by examiner

SUBSCRIPTION-BASED MOBILE STATION IDLE MODE CELL SELECTION

CROSS-REFERENCE TO PRIOR APPLICATION

This application claims the benefit of U.S. Provisional Application No. 60/039,997, filed Mar. 7, 1997.

BACKGROUND

The present invention relates to radiocommunication systems (e.g., cellular or satellite systems), and more particularly to techniques for steering radio traffic to preferred servers (e.g., base stations) when more than one candidate server exists.

In today's advanced radio telecommunication networks, there is a growing need for the ability to differentiate between different categories of end users (e.g., subscribers). This need may arise, for example, for a number of marketing reasons. One example of a marketing-driven reason for end user differentiation would be an operator's desire to guarantee that a selected group of end users (e.g., the employees of a particular company) will experience a certain traffic capacity when within the coverage area of certain servers (e.g., when within the coverage of the server installed at the company premises). In order to make this possible, it is important that other subscribers, not belonging to this subscriber group, be prevented from causing any traffic load in those specific servers.

Another example of a marketing driven reason for end user differentiation would be an operator's desire to offer subscriptions that are allowed access to only a limited part of the operator's network. The allowed service area is defined by a geographical area having coverage from one or several radio communication servers (e.g., base stations). In this case, it is important that the mobile station not cause any load in the radio communication system when it is situated outside the allowed service area. Furthermore, it is important for the subscriber in this instance to be alerted to the fact that he/she has traveled outside the allowed service area. This should be indicated by the mobile station.

Yet another example of a marketing motivated reason for end user differentiation would be an operator's desire to offer subscriptions with different tariff classes depending on the area where the service is requested and/or is received. In this case, it is important that the mobile station have information about the user's preferred service area(s) in order to choose the most preferred service area from among the presently available service areas. In this case, it is also important to make it possible for the user to know ahead of time whether a requested service setup will be done in the preferred area or not.

Despite the desirability of end user differentiation, the existing GSM mobile station (MS) idle mode cell selection/re-selection procedure does not include any subscription area considerations within a selected Public Land Mobile Network (PLMN). At best, it is possible for a GSM network operator, using conventional techniques, to:

1) define subscriptions with allowed access in only a part of the network (e.g., a predefined subset of cells);
2) limit the access of a number of subscribers (i.e., a "subscriber group") to only a part of the network (e.g., a predefined subset of cells); and
3) set special tariffs and allow special services depending on the subscription and where the subscriber makes the access.

However, if the network operator wants to have such functionality/service, then it must be handled by the network itself because, at present, the GSM standard does not give any support for any service area considerations during the MS idle mode cell selection. The MS does not have any subscription area information available when performing the idle mode cell selection. Consequently, the cell selection will be done in a similar way by all MSs within the PLMN, independent of the subscription.

Looking, for example, at a conventional approach to limiting a user's access to only a part of a network, when an MS has camped on a cell and is ready for service, the user is able to initiate a call set-up. Initially, this will result in a signaling connection being established up between the MS and the network. The network can then authenticate the MS and make necessary subscription controls. Depending on factors such as the subscription service area data (if any), the network can either accept or reject the call set up.

If the network rejects the call setup because the access was made outside the allowed area for the user, or if the access was made in a cell dedicated to be used only by a subscriber group to which the user does not belong, the signaling connection will be released. However, in the conventional systems, it is not possible for the network to prevent the user (i.e., the MS) from making a retry in the same cell. Such a retry will again result in a rejection from the network. It can be seen that the use of conventional techniques to introduce this type of end user differentiation functionality detrimentally loads the radio and network resources.

A further consequence of the conventional approach to defining a restricted coverage area for a user will be appreciated by considering an example in which an MS is in the coverage area of two cells, here designated cells A and B, each of which is suitable to camp on. Suppose that the MS calculates the C1 criterion for each of cells A and B, and finds that cell A is the best call and camps on this cell. If the user's subscription data indicates that only cell B is allowed to be used, the user's attempt to initiate a call will be rejected by the network (i.e., because the user has attempted a call through cell A). However, the conventional techniques do not provide any mechanism for either the user or the network to force the MS to camp on the other cell (i.e., cell B). Consequently, if radio conditions remain the same (e.g., the user does not move), the MS will continue to camp on cell A, and subsequent attempts to establish a call will all be futile.

Consider now an example in which conventional technology and techniques are applied to implement a "preferred area", that is, the designation of some cells in the system as being preferred over other cells with respect to handling calls initiated by a particular subscriber's MS. For this illustration, assume that the MS is in the coverage area of two cells (designated cell A and cell B), each of which is suitable to camp on. Assume further that the MS calculates the C1 criterion for each of cells A and B, and finds that cell A is the best cell. This would cause the MS to camp on cell A.

Suppose, however, that this subscriber's subscription data indicates that cell B is preferable to cell A (e.g., suppose that this subscriber's use of cell B will be free of charge, and that use of cell A will not be). Under these circumstances, it would be desirable for the subscriber's MS to camp on cell B instead of cell A. However, so long as the radio conditions remain the same (e.g., the user does not move), the MS will continue to camp on cell A, and any call that is made will be set up in the "expensive" cell. The conventional approach simply has no way to force the MS to camp on the other cell.

To recapitulate,

1) For a subscriber with allowed access in a limited part of a PLMN (i.e., a limited part of a GSM radio network), the mobile station will nonetheless occupy radio and network resources in the PLMN even though it may be outside the allowed part.

2) For a subscriber with allowed access in an entire PLMN but with preferred access in a limited part of this PLMN, the mobile station can initiate connection setup in cells outside the preferred part of the PLMN although there is another cell, belonging to the preferred part, that is suitable. For the definition of "suitable", see the ETSI publication TS GSM 03.22, v.4.11.0, which is hereby incorporated herein by reference.

3) Even if only a specific subscriber group is to be allowed access in a limited part of a PLMN, it is presently not possible to completely prevent other mobile stations (i.e., mobile stations associated with other subscribers) from occupying radio and network resources in this part of the PLMN.

Conventional systems fail to provide a satisfactory solution to these problems. For example, International Patent Application No. WO 95/07010 discloses a communication system in which a mobile station can switch between available domains in areas of overlapping coverage. The selection of domains is made on the basis of which services are to used. However, this publication fails to disclose any techniques for distinguishing between allowed domains, disallowed domains, respective preferred domains for camping and registration of a mobile network subscriber on the basis of subscriber identity irrespective of service.

U.S. Pat. No. 5,627,877 discloses an adaptive relocation of subscriber data between network entities when the subscriber moves in order to reduce demand for intra-network traffic. This publication does not disclose the possibility of reducing network traffic by defining allowed/disallowed service areas that are distinguished from one another, in the cell selection process performed by the mobile station, on the basis of subscription data.

U.S. Pat. No. 5,404,580 discloses the possibility of a particular radio telephone (i.e., particular mobile equipment) that only works with a particular Subscription Identification Module (SIM). This is effected by incorporating a memory unit into the radio telephone itself, wherein the memory unit has stored therein some subscription data. The obtained services are then dependent on the combination of this memory unit data and the SIM card that has been inserted into the radio telephone. U.S. Pat. No. 5,444,764 discloses a special case for the functionality given by U.S. Pat. No. 5,404,580. This special case gives the possibility of restricting the usage of a particular radio telephone to a subscriber with a SIM that has an IMSI that falls within a range of valid IMSIs. Information about these valid IMSIs is programmed into the radio telephone's own memory module.

U.S. Pat. No. 5,499,386, discloses a multi-level layered cellular radio architecture that serves mobile subscriber stations moving within the system. Best server selection is performed for the mobile stations by assigning within each cell a preference value to each other one of the cells with which it is associated by proximity of service area. The strength of the radio signal received by the mobile from the serving cell as well as the radio channels of associated cells is measured. A decision as to the best serving cell for the mobile station is made based upon both the preference value of the associated cells and the signal strength of their respective radio channels. In this manner, a Hierarchical Cell Structure (HCS) is established. However, the parameters that determine preferences in the cell selection process are the same for all mobile stations regardless of subscription.

SUMMARY

It is therefore an object of the present invention to provide apparatuses and methods for providing selected subscribers with exclusive access to particular service areas within a mobile communication network.

It is a further object of the present invention to provide apparatuses and methods for limiting a particular subscriber's access to only part of an operator's telecommunications network.

It is another object of the present invention to provide apparatuses and methods for alerting a subscriber to the fact that he/she has traveled outside of an allowed service area for that subscriber.

It is a still further object of the present invention to provide apparatuses and methods for allowing an operator to offer subscriptions with different tariff classes depending on the area where the service is requested and/or is received.

It is yet another object of the present invention to provide apparatuses and methods for allowing a mobile station to choose a preferred service area from among a plurality of available service areas, and to make it possible for the user of such a mobile station to know ahead of time whether a requested service setup will be done in a preferred area or not.

The foregoing and other objects are achieved in methods and apparatuses for use in a communication system that includes a public land mobile network and that is partitioned into a number of cells. In one aspect of the invention, a mobile communication device comprises means for communicating with the public land mobile network, and means for determining whether the mobile communication device is permitted to camp on one of the cells. This may be accomplished, in part, by means of a memory device, such as a Subscriber Information Module (SIM), for storing information about which of the cells may be camped on. In one embodiment, the stored information includes a list of cells that may be camped on, wherein the information in the list is arranged to show an order of preference for camping onto a cell. The means for determining whether the mobile communication device is permitted to camp on one of the cells may further include means for receiving cell-related information on a radio control channel that is broadcast from one of the cells in the communication system, wherein the cell-related information indicates whether the cell belongs to a part of the public land mobile network in which allowed access is controlled by subscription data.

In another aspect of the invention, the cell-related information may indicate that the cell belongs to a part of the public land mobile network in which allowed access is controlled by subscription data. The cell may further broadcast a standard "cell barred" signal. The mobile communication device may include means, responsive to the detecting means, for ignoring the cell barred information if the determining means determines that the cell may be camped on. Information about which of the cells may be camped on may be stored in a SIM.

In another aspect of the invention, a mobile communication system and method is provided that includes a public land mobile network; and means for broadcasting cell-related information from at least one of the cells, wherein for each cell, the cell-related information indicates whether that cell belongs to a part of the public land mobile network in which allowed access is controlled by subscription data.

A mobile communication device for use in the system may operate by receiving the cell-related information from at least one of the cells, and determining therefrom whether the mobile communication device is permitted to camp on the at least one of the cells.

In still another aspect of the invention, a mobile communication device for use in a communication system that includes a public land mobile network and that is partitioned into a number of cells includes wireless means for communicating with the public land mobile network; and means for determining whether any of the cells is part of a predefined service area, wherein the mobile communication device is permitted to utilize cells in the predefined service area and wherein at least one other mobile communication device for use in the communication system is not permitted to utilize cells in the predefined service area.

The means for determining whether any of the cells is part of a predefined service area may comprise a memory device for storing information about which of the cells are part of the predefined service area.

In another aspect of the invention, the mobile communication device may further include means for determining a list of suitable cells to be camped on; and means for selecting one of the suitable cells by giving higher priority to cells that are part of the predefined service area than to cells that are not part of the predefined service area.

In still another aspect of the invention, the means for determining whether any of the cells is part of a predefined service area may further comprise means for receiving cell-related information on a radio control channel that is broadcast from one of the cells in the communication system.

In yet another aspect of the invention, a method for use in a communications system that is partitioned into a number of cells, includes broadcasting cell-related information from at least one of the cells. In a mobile communication device for use in the communications system, the cell-related information is received from at least one of the cells. The received cell-related information is used to determine whether said at least one of the cells is part of a predefined service area, wherein the mobile communication device is permitted to utilize cells in the predefined service area and wherein at least one other mobile communication device for use in the communication system is not permitted to utilize cells in the predefined service area.

The cell-related information may be a cell identifier that uniquely identifies a corresponding cell. In this case, the step of using the received cell-related information to determine whether said at least one of the cells is part of a predefined service area may comprise retrieving stored information about which cells are in the predefined service area.

In an alternative embodiment, the cell-related information may be a service area identifier that uniquely identifies a service area that comprises one or more cells. In this case, the step of using the received cell-related information to determine whether said at least one of the cells is part of a predefined service area may comprise retrieving stored service area identifiers of predefined service areas.

In still another aspect of the invention, a mobile communication device is provided for use in a communication system that includes a public land mobile network and that is partitioned into a number of cells. The mobile communication device comprises wireless means for receiving cell-related information from one or more of the cells; and means for determining from the cell-related information whether one or more cells are to be given preference over other cells with respect to selection of a cell to be camped on during an idle mode operation of the mobile communication device.

In another aspect of the invention, the means for determining whether one or more cells are to be given preference over other cells with respect to selection of a cell to be camped on during an idle mode operation of the mobile communication device comprises a memory device for storing information about which of the cells are to be give preference.

In yet another aspect of the invention, the mobile communication device further comprises means for determining a list of suitable cells to be camped on; and means for selecting one of the suitable cells during the idle mode operation of the mobile communication device by giving higher priority to cells that are to be given preference over cells that are not to be given preference.

In yet another aspect of the invention, a method for use in a communications system that is partitioned into a number of cells, comprises the steps of: broadcasting cell-related information from at least one of the cells; and in a mobile communication device for use in the communications system, performing the steps of: receiving the cell-related information from at least one of the cells; and using the received cell-related information to determine whether said at least one of the cells is to be given preference over other cells with respect to selection of a cell to be camped on during an idle mode operation of the mobile communication device. The cell-related information may be a cell identifier that uniquely identifies a corresponding cell. In this case, the step of using the received cell-related information to determine whether said at least one of the cells is to be given preference over other cells with respect to selection of a cell to be camped on during an idle mode operation of the mobile communication device comprises retrieving stored information about which cells are to be given preference over other cells with respect to selection of a cell to be camped on during an idle mode operation of the mobile communication device.

Alternatively, the cell-related information may be a service area identifier that uniquely identifies a service area that comprises one or more cells. In this case, the step of using the received cell-related information to determine whether said at least one of the cells is to be given preference over other cells with respect to selection of a cell to be camped on during an idle mode operation of the mobile communication device comprises retrieving stored service area identifiers of service areas that are to be given preference over other cells with respect to selection of a cell to be camped on during an idle mode operation of the mobile communication device.

BRIEF DESCRIPTION OF THE DRAWINGS

The above and other objects and advantages of the invention will be understood by reading the following detailed description in conjunction with the drawings in which.

DETAILED DESCRIPTION

The various features of the invention will now be described with respect to the figures, in which like parts are identified with the same reference characters.

In accordance with one aspect of the invention, the SIM card located in a Mobile Station (MS) contains information identifying the allowed part or parts of a PLMN that the user of the MS is permitted to access. This information is used by the MS in idle mode for determining whether a cell is suitable to camp on (i.e., whether that cell is within the allowed part) or unsuitable to camp on (i.e., whether that cell is outside the allowed part of the PLMN).

By making the subscriber's service area information available in the MS, the MS can evaluate whether or not it is permissible to camp on any particular cell (i.e., for the purpose of obtaining service for the subscriber). Furthermore, this may be accomplished without activating any communications with the network (i.e., without occupying any radio and network resources).

In accordance with another aspect of the invention, the different parts of the PLMN in which the subscriber is permitted access are listed in order of preference on the SIM card within the MS. This list may then be used to enable the MS to select which of several candidate cells should be camped on. This may result in camping decisions that are different from those which are presently made in today's conventional systems. For example, if two cells are found suitable for camping, the cell belonging to that part of the PLMN that has higher preference, according to the list on the SIM card, will be chosen regardless of whether this cell has highest signal strength, provided that the impact on the cell frequency planning is avoided or minimized.

A benefit of this second aspect of the invention is that, by making the subscriber's service area preference information available in the MS, the MS can select and camp on the most preferred cell (of those cells available) as seen from the subscription point of view. Furthermore, this is achieved without activating any communication with the network (i.e., without occupying any radio and network resources).

In another aspect of the invention, the information broadcasted on a cell's radio control channel may include information indicating that the cell belongs to a part of the PLMN in which allowed access is controlled by subscription data. That is, only designated subscribers are allowed access to such a cell. As mentioned above, the SIM may be programmed to include information identifying those parts of the PLMN that the MS is allowed to obtain service from. Thus, this new broadcasted information is used by the MS in conjunction with the new SIM information to determine whether or not the cell is suitable to camp on.

In still another aspect of the invention, it is recognized that, in practice, existing (conventional) MSs (i.e., MSs without support for the new functionality) may coexist with the new MSs described herein. Thus, in order to prevent existing MSs not supporting the new functionality from camping on a cell where allowed access is controlled by subscription data, the cell may be barred in accordance with existing techniques, as defined by existing standards, such as the ETSI publication TS GSM 03.22, which is hereby incorporated herein by reference. In this case, MSs that support the new functionality described herein ignore the "cell barred" information if the cell belongs to a part of the PLMN in which allowed access is controlled by subscription data. These MSs may camp on such a cell if the subscription service area data indicates that this cell is allowed.

By broadcasting information indicating that use of a given cell is restricted to only those users whose subscription data specifies this given cell as one in which they are allowed access, the MS is made capable of evaluating whether a cell is or is not allowed to be camped on for the purpose of obtaining subscriber service. As with the other aspects of the invention, this benefit is achieved without activating any communication with the network (i.e., without occupying any radio and network resources).

Figure 1:
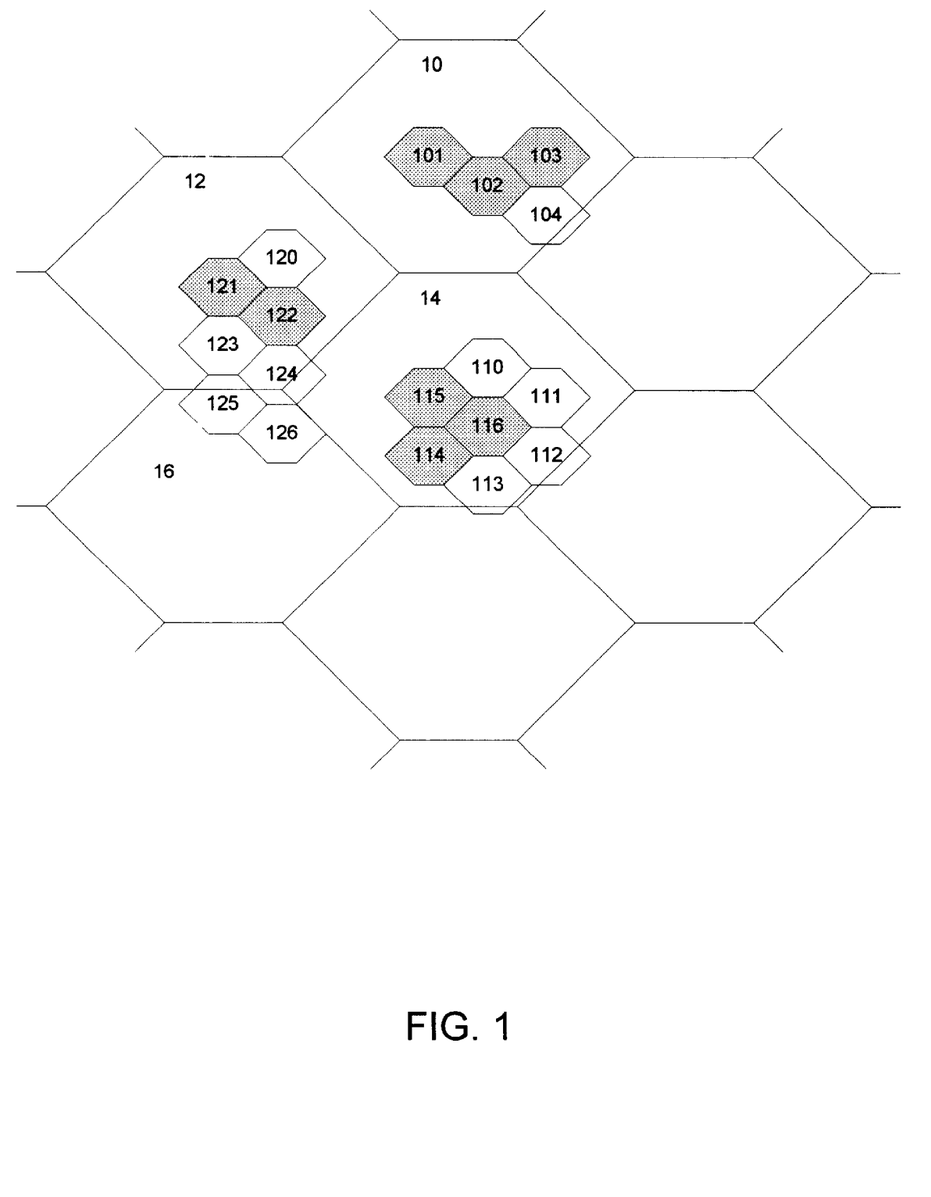
FIG. 1 is a block diagram illustrating a portion of a cellular communication network in which some cells have overlapping coverage.

The various aspects of the invention will now be described in greater detail with reference to exemplary embodiments. Referring first to FIG. 1, an exemplary service area is defined by the microcells 101, 102 and 103. A macrocell 10 overlaps this service area. When a MS (not shown in FIG. 1) is powered on, the C1 criterion as specified by TS GSM 05.08 version 4.18.2, which is published by ETSI and which is hereby incorporated herein by reference will find the most suitable cell to camp on. This will not necessarily be any of the cells in the service area, because those cells have very limited coverage with the C1 criterion. The C2 criterion, as specified by TS GSM 05.08, becomes active after a few seconds, and performs cell re-selection.

The above-mentioned cell selection and cell re-selection processes are used by all MSs in idle mode, regardless of the particular SIM that is inserted into the MS (i.e., independently of subscription data).

Referring back to FIG. 1, suppose the exemplary service area defined by the microcells 101, 102 and 103 is to be a preferred service area for employees of a particular company. In accordance with one aspect of the invention, this would be accomplished by having each of the employees receive a subscription with subscription data indicating this service area as the preferred area. That is, the SIM cards (for the MSs that these employees will use) are each programmed to store information identifying the preferred service area.

Figure 2:
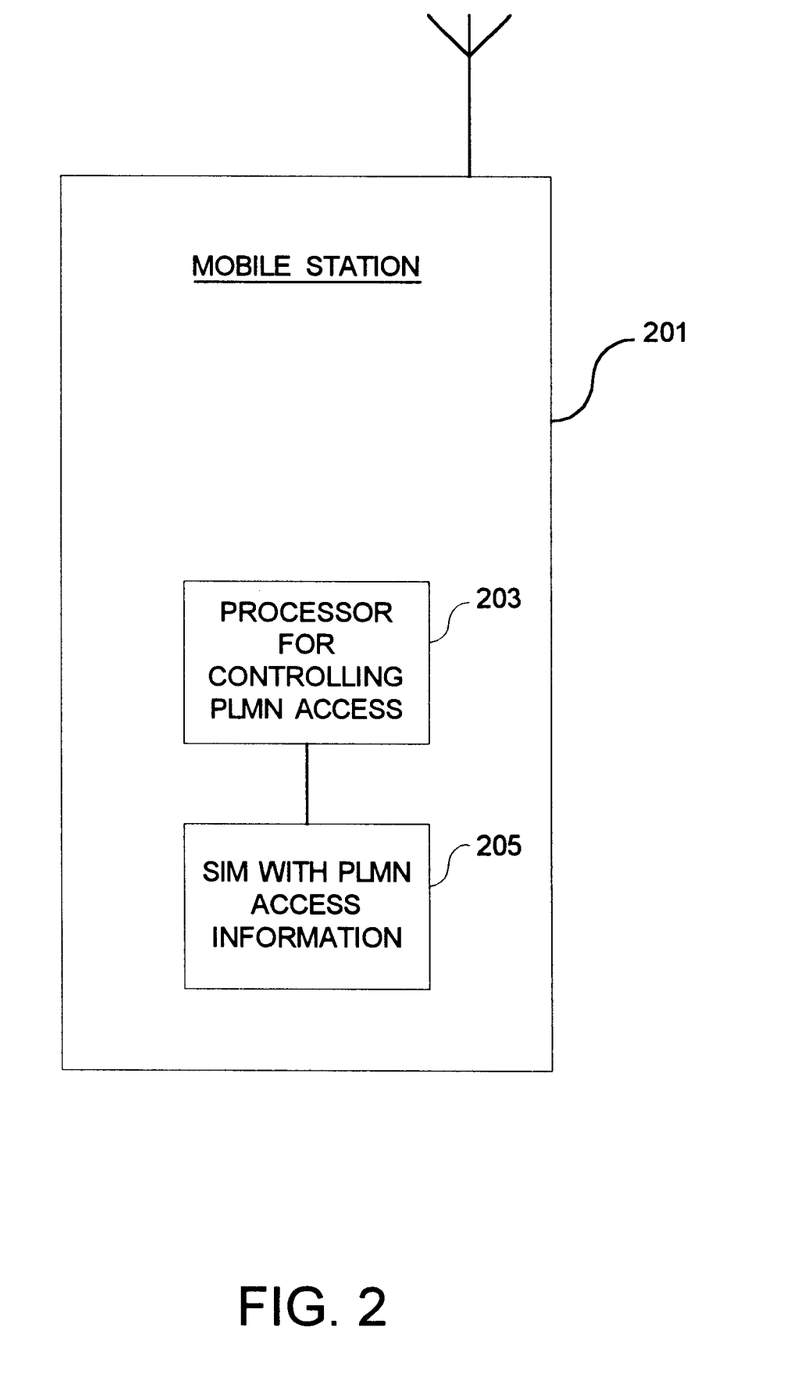
FIG. 2 is a block diagram of a mobile station including components for carrying out various aspects of the invention.
Figure 3:
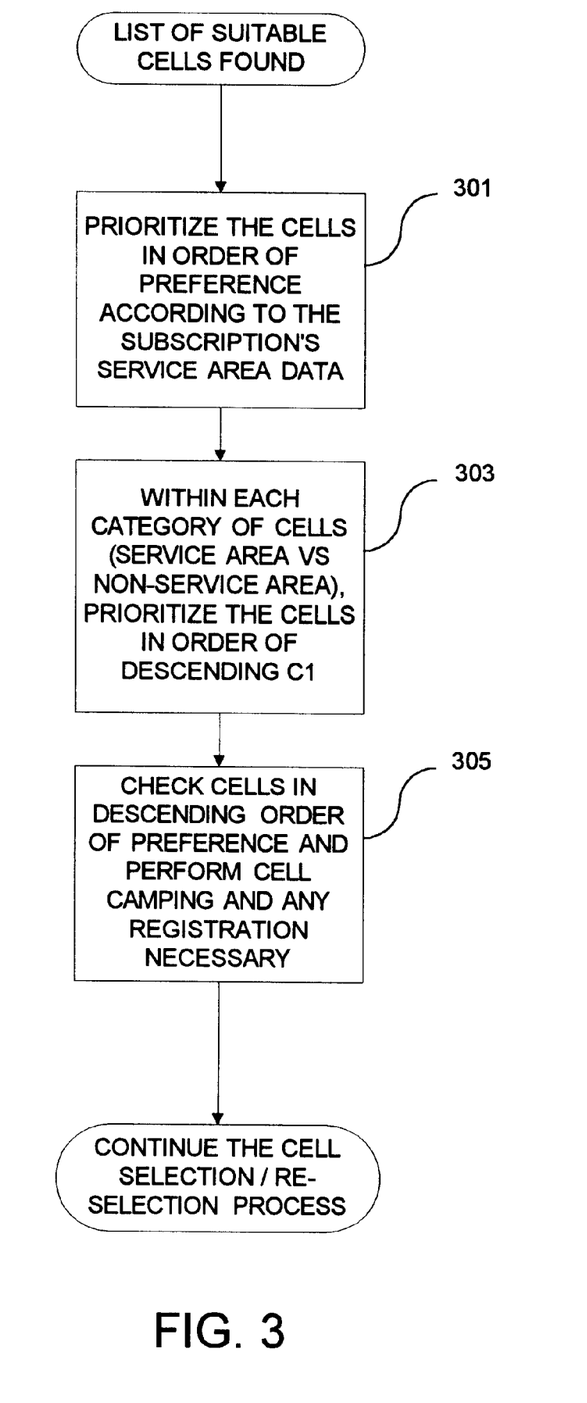
FIG. 3 is a flowchart depicting the additions needed in the cell selection/re-selection processes in order to include the handling of a subscriber's preferred service area data, in accordance with one aspect of the invention.

FIG. 2 is a block diagram of a mobile station 201 that includes components for carrying out various aspects of the invention. The illustrated components are a SIM 105 with PLMN access information as described herein, and a processor 103 for controlling PLMN access in accordance with the various techniques taught herein. Those having ordinary skill in the art will, of course, recognize that the mobile station 201 includes many other components as well, for the purpose of interacting with the conventional parts of the PLMN. In order to implement the preferred service area for the employees described in the example above, the processor 103 might carry out a process such as the one illustrated in the flowchart of FIG. 3. FIG. 3 is a flowchart depicting the additions needed in the cell selection/re-selection processes in order to include the handling of the subscription's preferred service area data, in accordance with one aspect of the invention.

The present criteria for cell selection in a GSM system (which is performed by all MSs in idle mode) is based on a parameter called C1. In accordance with known techniques, the MS searches all Radio Frequency (RF) channels defined for the mobile system (one RF channel for each cell) and measures received RF signal strength on each RF channel. The MS then calculates an averaged received level on each RF channel. The averaging is based on some measurement samples per RF channel spread over a period of time. For each RF channel (i.e., for each cell), the parameter C1 is then evaluated. The C1 parameter is based, among other things, on the received level average and a minimum signal strength level set by the network. The cells are then prioritized in order of descending C1. The MS will typically camp on the cell at the top of the list.

In accordance with one aspect of the invention, the above-technique is modified in order to take into account the preference for service area cells. In particular, after evaluating the C1 parameter for each cell and determining which cells are suitable, the cells are prioritized first so that those cells belonging to the subscriber's service area (as determined from the data in the SIM 205) are all given higher priority than cells not belonging to the subscriber's service area (step 301).

Next, within each cell category (i.e., service area versus non-service area), the cells are prioritized in order of descending C1 (step 303). The MS 201 then checks cells in descending order of preference to find one to camp on and register with (step 305). Following this, the cell selection/re-selection process continues in accordance with techniques that are known in the art, and need not be described here.

In another aspect of the invention, the MS may avoid disturbing the radio frequency planning in the network by further introducing a new parameter, herein referred to as a "quality assurance parameter." The quality assurance parameter prevents the MS 201 from camping on any cell that has a C1 value that is too much less than the highest C1 value associated with any other cell. That is, the quality assurance parameter defines the maximum allowed difference between the highest C1 value determined for a cell and the C1 value of the tentatively chosen "preferred" cell. If the difference is greater, then the "preferred" cell will not be chosen.

The value of the new quality assurance parameter may be obtained in a number of ways. It may, for example, be defined in the standard for the mobile system, and then stored in the MS 201. Alternatively, it may be cell specific, and determined by the network operator. In this case, the quality assurance parameter should be broadcast in each cell, so that it can be read by MSs in idle mode. In yet another alternative, the quality assurance parameter may be network specific, in which case it is determined by the network operator. Here, the parameter value can be stored together with the subscription service area data, and made available to the MS 201 with the subscription service area data.

Considering now another aspect of the invention, suppose a network operator wants to offer radio network coverage within a company's premises and wants to guarantee a minimum traffic capacity that is estimated based on, for example, the number of employees of the company. Suppose further that, in order to make the guarantee, the network operator is prepared to set up a number of cells that are to be dedicated for use by the company's employees only. For example, referring back to FIG. 1, the company's premises might be served by the dedicated microcells 121 and 122 that are located in macrocell 12. It will be observed that macrocell 12 also includes other microcells, such as the microcells 120, 123 and 124. Under conventional systems, this approach creates a problem because there is no way to prevent non-employee subscribers who enter the coverage area of the "dedicated" cells (e.g., microcells 121 and 122) from camping on these cells and occupying radio resources, thereby using traffic capacity that is supposed to be dedicated for use only by the company employees.

This problem is solved in accordance with an aspect of the invention in which the MSs used by the specific subscriber group regard the dedicated cells, herein call "exclusive access cells", as "allowed" and with highest priority. By contrast, the remaining MSs in the system (i.e., those MSs that are used by other subscriber groups) will never see these cells as "allowed", and will consequently never use/camp on these cells.

In accordance with this aspect of the invention, the "exclusive access cells" (e.g., microcells 121 and 122) broadcast information that indicates that these cells are for exclusive access by only those users whose subscription data indicates these cells as being "allowed". This information is used by each MS in the system to determine whether or not the cell is suitable for camping and registration.

As mentioned earlier, it is recognized that, in practice, existing (conventional) MSs (i.e., MSs without support for the new functionality) may coexist with the new MSs described herein. Thus, in order to prevent existing MSs not supporting the new functionality from camping on a cell where allowed access is controlled by subscription data, the cell may be barred in accordance with existing techniques as defined by existing standards, such as the ETSI publication TS GSM 03.22. In this case, MSs that support the new functionality described herein ignore the "cell barred" information if they detect, in addition to the conventional "cell barred" indicator, the new information broadcast by the cell that indicates that the cell belongs to a part of the PLMN in which allowed access is controlled by subscription data. These MSs may camp on such a cell if the subscription service area data indicates that this cell is allowed.

Figure 4:
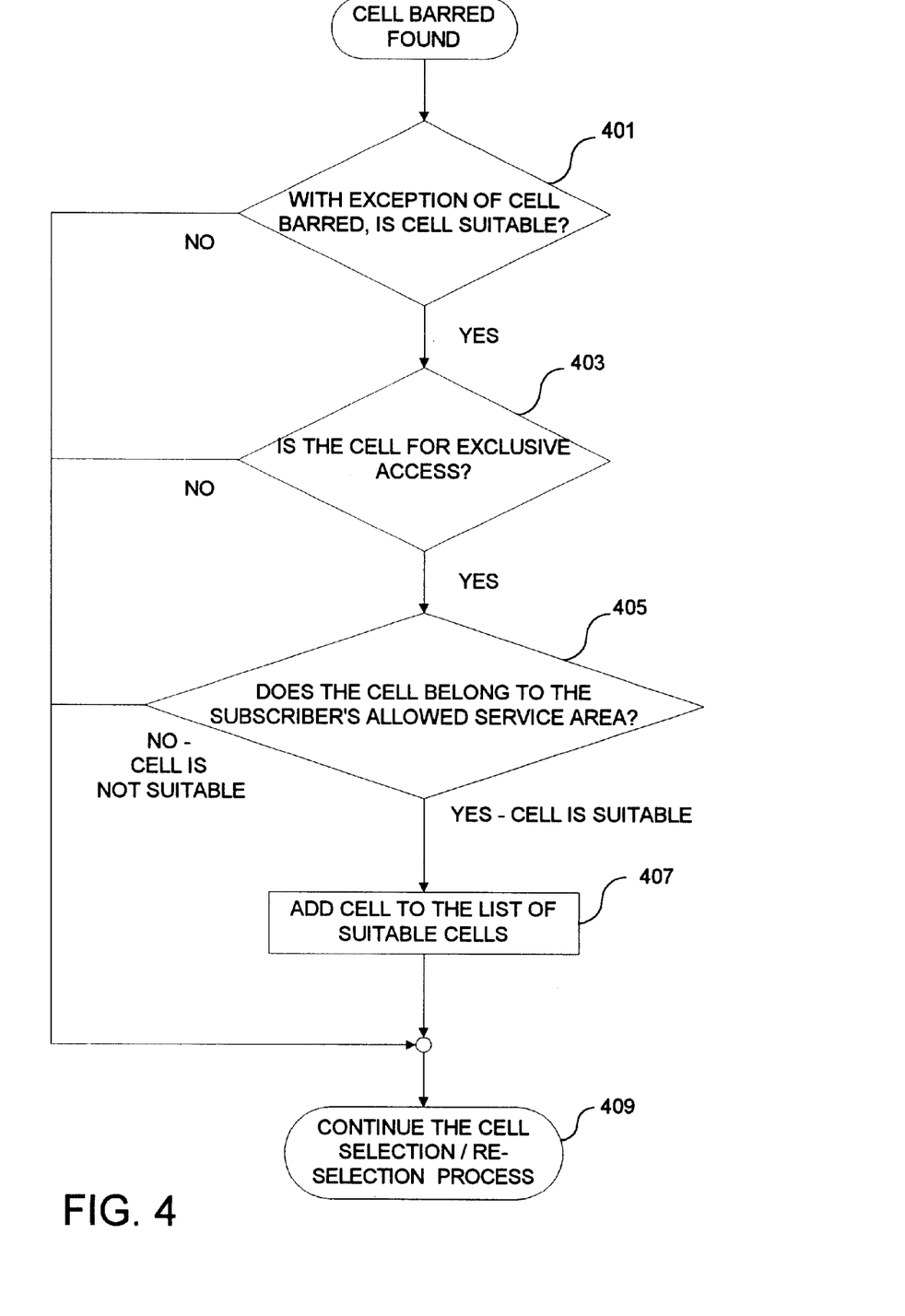
FIG. 4 is a flowchart depicting an addition to the MS's idle mode cell selection/re-selection process for handling exclusive access cells in accordance with one aspect of the invention.

For the existing (conventional) MSs, no new software or hardware is needed to support exclusive access cells because the cell will appear to be barred in accordance with known techniques. (The new "exclusive access cell" indicator that is transmitted from the cells will not be understood by conventional MSs, and will consequently be ignored by these MSs.) For the new MSs, additional steps, such as those depicted in the flowchart of FIG. 4, should be performed as part of the idle mode cell selection/re-selection process. In particular, FIG. 4 shows steps to be performed by the processor 203 when a cell is transmitting "cell barred" information in accordance with known techniques. Notwithstanding the "cell barred" indication, the MS 201 determines whether the cell is otherwise suitable for camping/registration (decision block 401). If it is not, then the cell is removed from further consideration, and processing continues with steps to continue the cell selection/re-selection process (step 409).

If the cell is otherwise suitable, then a test is performed to determine whether the cell is for exclusive access (decision block 403). That is, the MS 201 determines whether the cell is broadcasting the new "exclusive access cell" indicator in addition to the standard "cell barred" indicator. If it is not, then the cell is barred for other reasons, and the processing continues with steps to continue the cell selection/re-selection process (step 409).

If the cell is for exclusive access, a test is performed to determine whether this particular cell belongs to the subscriber's allowed service area (decision block 405). In order to perform this step, the processor 203 accesses subscriber information stored in the SIM 205, and compares the cell identification with the retrieved information identifying those cells that make up the allowed service area.

If this particular cell belongs to the subscriber's allowed service area, then this cell is added to the list of suitable cells (step 407), and processing continues with steps to continue the cell selection/re-selection process (step 409). For example, cell selection (for camping/registration) may proceed in accordance with conventional techniques. Alternatively, the list of suitable cells may be arranged as described above with reference to FIG. 3. In this latter case, subscription service information would be used, in part, to prioritize the final list of suitable cells.

Consider now another situation in which a network operator wants to offer subscriptions that are allowed access to only a limited part of the network. For example, consider the macrocell 14 illustrated in FIG. 1. The macrocell 14 includes microcells 110, 111, 112, 113, 114, 115 and 116. Suppose that it is desired to have a subscriber who is only permitted to access a service area defined by microcells 114, 115 and 116. This cannot be accomplished in conventional systems because such systems do not have any way to prevent a MS from camping on cells that are outside of an allowed area that is determined as a function of subscription information.

Figure 5:
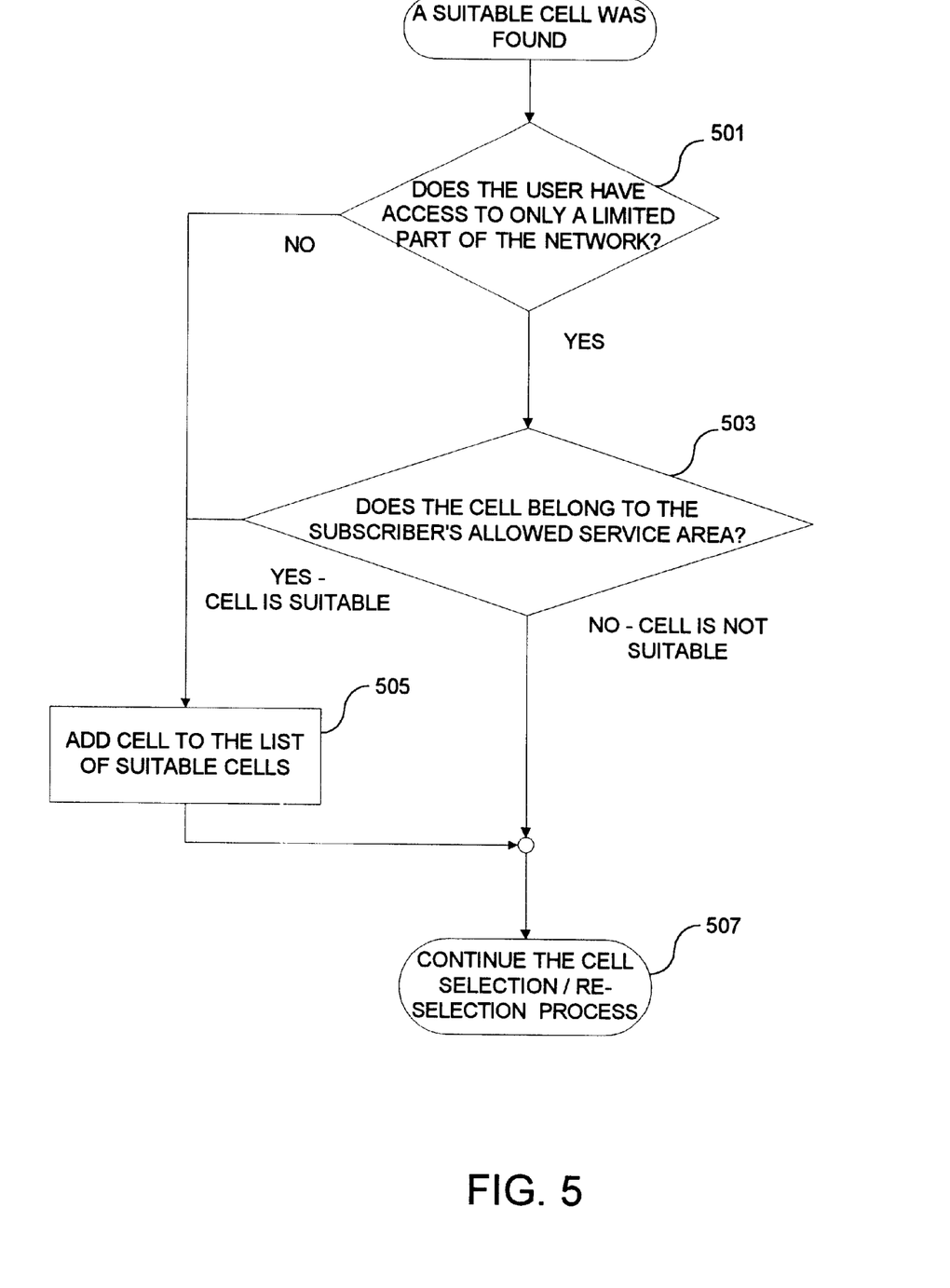
FIG. 5 is a flowchart depicting an addition to the MS's idle mode cell selection/re-selection process for handling subscriptions having allowed access in a limited part of the network in accordance with one aspect of the invention.

This problem is solved in accordance with another aspect of the invention in which the MS will not perform normal camping on a cell if the cell is outside the allowed area set by the subscription service area data stored in the SIM 205. FIG. 5 is a flowchart depicting exemplary steps that may be added to the MS's idle mode cell selection/re-selection process in order to handle subscriptions having allowed access in a limited part of the network. In particular, after a suitable cell is found for camping/registration, the processor 203 in the MS 201 accesses information in the SIM 205 in order to determine whether the user has access to only a limited part of the network (decision block 501). If not, then the cell is added to the list of suitable cells (step 505), and processing continues with steps for continuing the cell selection/re-selection process (step 507).

If the cell does not belong to the subscriber's allowed service area ("No" path out of decision block 503), then the cell is no longer considered a suitable candidate, and processing proceeds directly with steps for continuing the cell selection/re-selection process (step 507).

Turning now to other aspects of the invention, in order for the MS 201 to determine whether a cell belongs to a service area in which the user of the MS 201 has allowed/preferred access rights, the information defining a service area must be defined. Two alternatives for this are as follows:

In a first alternative, a service area may be defined by a service area identity. In cells constituting a service area, the service area identity is broadcasted. For example, each of the microcells 101, 102 and 103 (see FIG. 1) would broadcast the same service area identifier. The MS 201 would then be able to obtain the service area identity of any one (or all) of the cells, and compare this service area identifier with the subscriber's service area information (e.g., a list of service areas) stored in the SIM 205. An advantage of this alternative is that it is less dependent on changes in the radio network. For example, adding a cell to a service area does not create any need to update the subscriber's service area information in the MS 201. Furthermore, the size of memory in the SIM 205 that is used for storage of the subscriber's service area information is independent of the number of cells constituting a service area.

In a second alternative, a service area is defined by a list of cell identities. In this case, no special service area identity is broadcast for cells constituting a single service area. For example, each of the microcells 101, 102 and 103 (see FIG. 1) would broadcast their individual cell identifiers, even though, collectively, they constitute a single service area. The MS 201 receives these individual cell identifiers, and compares these with the service area cell identity list(s) (i.e., the subscriber's service area information stored in the SIM 205). An advantage of this alternative is that, because the cell identity is already broadcast in a cell, no additional identity information needs to be broadcast in a cell belonging to a service area.

The above-described techniques rely on the subscriber's service area information being stored in the SIM 205. There are several alternative embodiments for providing this information to the SIM 205. In one alternative, the network operator or service provider may pre-program the SIM with the subscriber's service area information before giving the SIM 205 to the subscriber. A consequence of this approach is that if the information is changed for any reason, the subscriber must return the SIM 205 to the network operator or service provider for updating. Benefits to this approach, however, include the fact that it has a reduced impact on the network implementation, and is probably more secure.

In an alternative embodiment, the subscriber's service area information may be stored in a data base within the mobile network (e.g., within the subscriber's home location register or other service node). When the subscriber's MS 201 performs network registration for the first time after the subscriber's service area information is established, or the first time after the subscriber's service area information has changed, the network will send the information to the MS 201. Benefits of this approach include the fact that a change of a subscriber's service area information requires a simpler procedure for the operator or service provider and for the end user no actions are needed to be defined.

The above-described techniques relate to the use of a subscriber's service area information when an MS is in idle mode. When the MS is in active communication with the network, the subscriber's service area information can be used by the network to make handover decisions (i.e., to decide which cells are candidates to take over responsibility for an ongoing call). Techniques for using subscriber information in this way are described in U.S. patent application Ser. No. 08/872,065 entitled "Tailored Hierarchical Cell Structures in a Communications System", and filed on Jun. 10, 1997 in the name of Tomas Fried et al.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A mobile communication device for use in a communication system that includes a public land mobile network and that is partitioned into a number of cells, the mobile communication device comprising:

wireless means for communicating with the public land mobile network; and means for determining whether the mobile communication device is permitted to camp on one of the cells in the communication system, wherein a result of determining whether the mobile communication device is permitted to camp on one of the cells in the communication system is not indicative of whether the mobile communication device is permitted to camp on another cell in the communication system; and wherein said means for determining whether the mobile communication device is permitted to camp on one of the cells in the communication system comprises:

means for receiving cell-related information, wherein the cell-related information indicates whether the cell belongs to a part of the public land mobile network in which allowed access is controlled by subscription data;

detecting means for detecting that the cell-related information indicates that the cell belongs to a part of the public land mobile network in which allowed access is controlled by subscription data;

means for receiving cell barred information from the communication system;

means, responsive to the detecting means, for ignoring the cell barred information if the determining means determines that the cell may be camped on.

2. The mobile communication device of claim 1, wherein the means for determining whether the mobile communication device is permitted to camp on one of the cells further comprises a memory device for storing information about which of the cells may be camped on.

3. The mobile communication device of claim 2, wherein the information about which of the cells may be camped on includes a list of cells that may be camped on, wherein the information in the list is arranged to show an order of preference for camping onto a cell.

4. The mobile communication device of claim 3, wherein the means for determining whether the mobile communication device is permitted to camp on one of the cells further includes:

means for determining that at least two cells in the communication system may be camped on; and means for using the information in the memory device to select a highest priority one of the at least two cells.

5. The mobile communication device of claim 2, wherein the means for receiving cell-related information receives the cell related information on a radio control channel that is broadcast from one of the cells in the communication system.

6. The mobile communication device of claim 1, wherein the means for determining whether the mobile communication device is permitted to camp on one of the cells comprises a subscription identification module that contains information about which of the cells may be camped on.

7. A mobile communication system that is partitioned into a number of cells, comprising:

a public land mobile network, wherein a mobile communication device is permitted to utilize cells in a predefined service area of the public land mobile network and wherein at least one other mobile communication device is not permitted to utilize cells in the predefined service area;

means for broadcasting cell-related information from at least one of the cells, wherein for each cell, the cell-related information indicates whether that cell belongs to the predefined service area of the public land mobile network in which allowed access is controlled by subscription data; and at least one mobile communication device that comprises:
means for receiving the cell-related information from at least one of the cells;

means, responsive to the received cell-related information, for determining whether the mobile communication device is permitted to camp on the at least one of the cells;

detecting means for detecting that the cell-related information indicates that the cell belongs to a part of the public land mobile network in which allowed access is controlled by subscription data;

means for receiving cell barred information from the at least one of the cells; and means, responsive to the detecting means, for ignoring the cell barred information if the determining means determines that the cell may be camped on.

8. A method for use in a communications system that is partitioned into a number of cells, comprising the steps of:

broadcasting cell-related information from at least one of the cells, wherein for each cell, the cell-related information indicates whether that cell belongs to a predefined service area of the public land mobile network in which allowed access is controlled by subscription data and wherein a mobile communication device is permitted to utilize cells in the predefined service area and at least one other mobile communication device is not permitted to utilize cells in the predefined service area; and in a mobile communication device, performing the steps of:

receiving the cell-related information from at least one of the cells;

in response to the received cell-related information, determining whether the mobile communication device is permitted to camp on the at least one of the cells, wherein the step of determining whether the mobile communication device is permitted to camp on one of the cells comprises retrieving stored information about which of the cells may be camped on;

detecting that the cell-related information indicates that the cell belongs to a part of the public land mobile network in which allowed access is controlled by subscription data;

receiving cell barred information from the at least one of the cells; and ignoring the cell barred information if the determining means determines that the cell may be camped on and the cell-related information indicates that the cell belongs to a part of the public land mobile network in which allowed access is controlled by subscription data.

9. A mobile communication device for use in a communication system that includes a public land mobile network and that is partitioned into a number of cells, the mobile communication device comprising:

wireless means for receiving cell-related information from one or more of the cells, wherein the cell-related information indicates whether the cell belongs to a part of the public land mobile network in which allowed access is controlled by the subscription data;

means for determining from the cell-related information whether one or more cells in the communication system are to be given preference over other cells in the communication system with respect to selection of a cell to be camped on during an idle mode operation of the mobile communication device; and wherein said means for determining from the cell-related information whether one or more cells in the communication system are to be given preference over other cells in the communication system with respect to selection of a cell to be camped on during an idle mode operation of the mobile communication device comprises:

detecting means for detecting that the cell-related information indicates that the cell belongs to a part of the public land mobile network in which allowed access is controlled by subscription data;

means for receiving cell barred information from the communication system; and     means, responsive to the detecting means, for ignoring the cell barred information if the determining means determines that the cell may be given preference over other cells in the communication system with respect to selection of a cell to be camped on during an idle mode operation of the mobile communication device.

10. The mobile communication device of claim 9, wherein the means for determining whether one or more cells are to be given preference over other cells with respect to selection of a cell to be camped on during an idle mode operation of the mobile communication device further comprises a memory device for storing information about which of the cells are to be give preference.

11. The mobile communication device of claim 10, further comprising:

means for determining a list of suitable cells to be camped on; and     means for selecting one of the suitable cells during the idle mode operation of the mobile communication device by giving higher priority to cells that are to be given preference over cells that are not to be given preference.

12. The mobile communication device of claim 11, wherein the wireless means for receiving cell-related information from one or more of the cells receives the cell-related information on a radio control channel that is broadcast from one of the cells in the communication system.

13. A method for use in a communications system that is partitioned into a number of cells, comprising the steps of:

broadcasting cell-related information from at least one of the cells, wherein the cell-related information indicates whether the cell belongs to a part of the public land mobile network in which allowed access is controlled by subscription data; and     in a mobile communication device for use in the communications systems, performing the steps of:

receiving the cell-related information from at least one of the cells; and         using the received cell-related information to determine whether said at least one of the cells in the communication system is to be given preference over other cells in the communication system with respect to selection of a cell to be camped on during an idle mode operation of the mobile communication device;

detecting that the cell-related information indicates that said at least one of the cells in the communication system belongs to a part of the public land mobile network in which allowed access is controlled by subscription data;

receiving cell barred information from the at least one of the cells; and         ignoring the cell barred information if the determining means determines that the cell may be given preference over other cells in the communication system with respect to selection of a cell to be camped on during an idle mode operation of the mobile communication device.

14. The method of claim 13, wherein the cell-related information is a cell identifier that uniquely identifies a corresponding cell.

15. The method of claim 14, wherein the step of using the received cell-related information to determine whether said at least one of the cells is to be given preference over other cells with respect to selection of a cell to be camped on during an idle mode operation of the mobile communication device further comprises retrieving stored information about which cells are to be given preference over other cells with respect to selection of a cell to be camped on during an idle mode operation of the mobile communication device.

16. The method of claim 13, wherein the cell-related information is a service area identifier that uniquely identifies a service area that comprises one or more cells.

17. The method of claim 16, wherein the step of using the received cell-related information to determine whether said at least one of the cells is to be given preference over other cells with respect to selection of a cell to be camped on during an idle mode operation of the mobile communication device further comprises retrieving stored service area identifiers of service areas that are to be given preference over other cells with respect to selection of a cell to be camped on during an idle mode operation of the mobile communication device.

\* \* \* \* \*